United States Patent
Gonikberg

(10) Patent No.: US 8,463,221 B2
(45) Date of Patent: *Jun. 11, 2013

(54) METHOD AND SYSTEM FOR WIRELESS LOCAL AREA NETWORK (WLAN) PHASE SHIFTER TRAINING

(75) Inventor: Mark Gonikberg, Los Altos Hills, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/310,938

(22) Filed: Dec. 5, 2011

(65) Prior Publication Data

US 2012/0093140 A1    Apr. 19, 2012

Related U.S. Application Data

(63) Continuation of application No. 11/944,955, filed on Nov. 26, 2007, now Pat. No. 8,086,203.

(51) Int. Cl.
*H04B 1/06* (2006.01)
*H04B 7/00* (2006.01)

(52) U.S. Cl.
USPC ........ 455/277.1; 455/101; 455/130; 455/272; 455/276.1; 375/329; 375/334; 375/336; 375/347

(58) Field of Classification Search
USPC ................. 455/277.1, 101, 130, 272, 276.1, 455/301; 375/329, 334, 336, 347
See application file for complete search history.

(56) References Cited

U.S. PATENT DOCUMENTS 8,086,203 B2 * 12/2011 Gonikberg ................ 455/277.1

* cited by examiner

*Primary Examiner* — Tuan Pham

(74) *Attorney, Agent, or Firm* — Garlick & Markison; Bruce E. Garlick

(57) ABSTRACT

Aspects of a method and system for wireless local area network (WLAN) phase shifter training are presented. Aspect of the system may enable a receiving station, at which is located a plurality of receiving antennas, to estimate the relative phase at which each of the receiving antennas receives signals from a transmitting station. This process may be referred to as phase shifter training. After determining the relative phase for each of the receiving antennas, the receiving station may process received signals by phase shifting the signals received via each of the receiving antennas in accordance with the relative phase shifts determined during the phase shifter training process. Signals received via a selected one of the receiving antennas may be unshifted. The processed signals may be combined to generate a diversity reception signal.

20 Claims, 6 Drawing Sheets

METHOD AND SYSTEM FOR WIRELESS LOCAL AREA NETWORK (WLAN) PHASE SHIFTER TRAINING

CROSS-REFERENCE TO RELATED APPLICATIONS/INCORPORATION BY REFERENCE

This patent application is a continuation of U.S. application Ser. No. 11/944,955, filed on Nov. 26, 2007, which is hereby incorporated herein by reference in its entirety for all purposes.

FIELD OF THE INVENTION

Certain embodiments of the invention relate to data communication. More specifically, certain embodiments of the invention relate to a method and system for wireless local area network (WLAN) phase shifter training.

BACKGROUND OF THE INVENTION

Wireless local area network (WLAN) systems enable the communication of data via a wireless communication medium by, for example, transmitting radio frequency (RF) signals that carry data between a transmitting station and a receiving station. A range of frequencies, referred to as the WLAN frequency spectrum, may be utilized for communication between stations in a WLAN system. The frequency spectrum may be divided into RF channels wherein each RF channel represented an assigned frequency within the WLAN frequency spectrum. Each RF channel may, in turn, comprise a range of frequencies referred to as an RF channel bandwidth. Each RF channel within the WLAN frequency spectrum may comprise a range of frequencies, which is non-overlapping and distinct from other RF channels.

In a typical WLAN setting there are various objects present in addition to the transmitting station and the receiving station. The transmitting station transmits data to the receiving station via data symbols, which are transmitted via a transmitted signal. The transmitted signal may comprise a one or more frequency carrier signals (wherein each frequency carrier signal is associated with a distinct frequency within a given RF channel bandwidth), which are utilized to generate a corresponding one or more carrier-modulated signals to enable the transport of the data symbols via the wireless communication medium. The time interval, beginning at the time instant at which the transmitting station begins transmission one or more current data symbols via the one or more frequency carrier signals, and ending at the time instant at which the transmitting station begins transmission of a subsequent one or more data symbols may be referred to as a symbol period.

Signals transmitted by the transmitting stations typically experience a natural expansion of the radio wave front as the signals propagate in the wireless communication medium. Portions of the expanding signal often interact with the various objects present in the WLAN setting and are, in many cases, reflected off the various objects. The reflected signal portions may continue propagating in the wireless communication medium. One or more portions of a transmitted signal may experience multiple reflections while propagating through the wireless communication medium. Each of the one or more portions of the transmitted signal is referred to as a multipath signal. The path traveled by a multipath signal may be referred to as a signal path.

A plurality of multipath signals may be received at the receiving station. The multipath signals may comprise a line of sight (LOS) signal, which is transmitted from the transmitting station, via the wireless communication medium, to the receiving station without encountering reflections. In addition, the multipath signals may comprise one or more signals, which encounter one or more reflections while propagating from the transmitting station to the receiving station via the wireless communication medium. The various multipath signals, which are received at the receiving station, may arrive at different time instants. The time interval, beginning at the time instant at which the first of the multipath signals arrives at the receiving station and ending at the time instant at which the last of the multipath signals arrives at the receiving station is referred to as a delay spread.

In addition to delay spread that results from multiple signal paths, there may also be a delay spread within a given signal path. For example, in WLAN systems, which utilize orthogonal frequency division multiplexing (OFDM), an OFDM symbol may be generated by concurrently transmitting individual data symbols via a plurality of concurrently transmitted frequency carrier signals. Delay spread may occur within a given signal path when some of the frequency carrier signals within an RF channel bandwidth propagate through the wireless communication medium at different speed(s) relative to other frequency carrier signals. The delay spread may be utilized to determine the coherence bandwidth for the RF channel.

Signals, which are transmitted from a transmitting station to a receiving station, are typically subjected to distortion as they are propagated through the wireless communication medium. Consequently, the receiving station may receive a distorted version of the signals transmitted by the transmitting station. The distortion of transmitted signals is referred to as fading. Two types of fading are flat fading and frequency selective fading. Flat fading may occur when the delay spread is less than the symbol period, or correspondingly, when the signal bandwidth for the RF channel is less than the coherence bandwidth. In a flat fading RF channel, amplitude fading may be a contributor to the signal fading in the RF channel. Amplitude fading refers to the tendency of signals to attenuate as they are propagated through a wireless communication medium. Frequency selective fading may occur when the delay spread is greater than the symbol period, or correspondingly, when the signal bandwidth for the RF channel is greater than the coherence bandwidth. In a frequency selective fading RF channel, intersymbol interference may be a contributor to signal fading in the RF channel. Intersymbol interference refers to an occurrence in which a receiving station begins to receive signals for a current one or more transmitted data symbols while still receiving signals from a previous one or more transmitted data symbols.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for wireless local area network (WLAN) phase shifter training, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for wireless local area network (WLAN) phase shifter training. Various embodiments of the invention comprise a system, which enables a receiving station, at which is located a plurality of receiving antennas, to estimate the relative phase at which each of the receiving antennas receives signals from a transmitting station. This process may be referred to as phase shifter training. After determining the relative phase for each of the receiving antennas, the receiving station may process received signals by phase shifting the signals received via each of the receiving antennas in accordance with the relative phase shifts determined during the phase shifter training process. In various embodiments of the invention, signals received via a selected one of the receiving antennas may be unshifted. The processed signals may be combined to generate a diversity reception signal.

Figure 1:
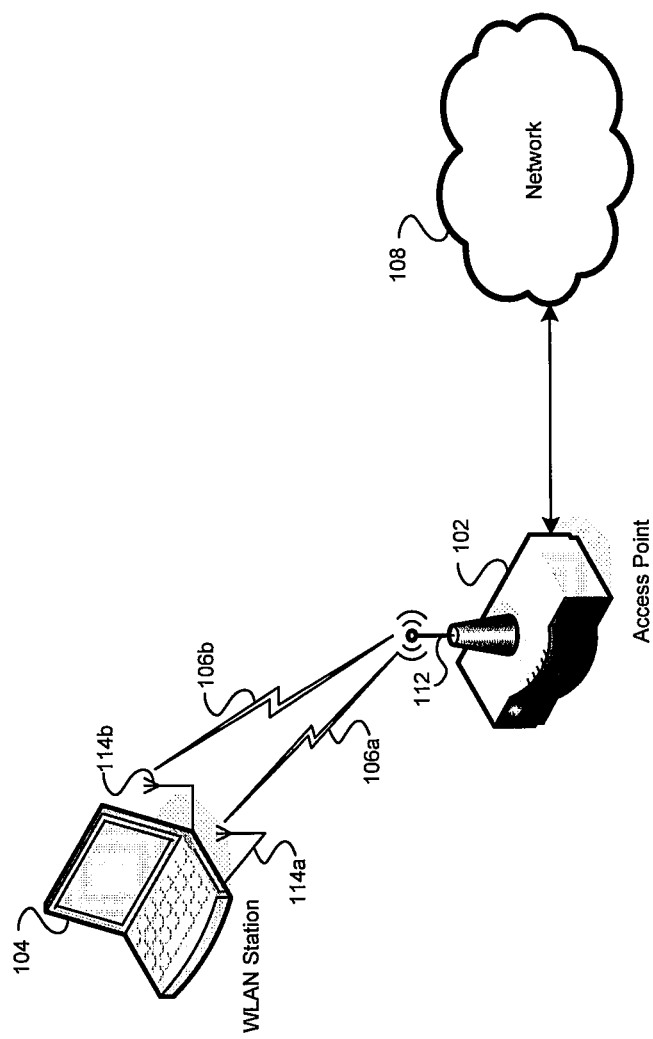
FIG. 1 is an exemplary wireless communication system, which may be utilized in connection with an embodiment of the invention.

FIG. 1 is an exemplary wireless communication system, which may be utilized in connection with an embodiment of the invention. Referring to FIG. 1, there is shown an access point (AP) 102, a wireless local area network (WLAN) station (STA) 104, and a network 108. The AP 102 and the STA 104 may communicate wirelessly via one or more radio frequency (RF) channels 106a and 106b. The AP 102 and STA 104 may each comprise a plurality of transmitting antennas and/or receiving antennas. As shown in FIG. 1, the AP comprises a single transmitting antenna 112, and the STA 104 comprises a plurality of receiving antennas 114a and 114b. The AP 102 may be communicatively coupled to the network 108. The AP 102, STA 104 and network 108 may enable communication based on one or more IEEE 802 standards, for example IEEE 802.11.

The STA 104 may utilize a plurality of RF channels 106a and 106b to receive signals from the AP 102. The AP 102 may utilize the transmitting antenna 112 to transmit signals, which may be received at the STA 104, via RF channel 106a at receiving antenna 114a, and via RF channel 106b at receiving antenna 114b. The signals received via RF channels 106a and 106b may comprise one of more frequencies associated with a channel as determined by a relevant standard, such as IEEE 802.11.

In operation, the STA 104 may receive a plurality of multipath signals via the RF channels 106a and 106b. The multipath signals may be generated based on the transmission of signals by the AP 102. At least a portion of the multipath signals may be received at the STA 104 via RF channel 106a and a subsequent portion of the multipath signals may be received via RF channel 106b. Depending upon the relative positions of the AP 102 and the STA 104, the length of the signal path for a signal received via receiving antenna 114a may differ from the length of the corresponding signal path for the signal received via receiving antenna 114b. For example, for a LOS signal, the length of the signal path from the transmitting antenna 112 to the receiving antenna 114a may be referred to as $d_1$, while the length of the signal path from the transmitting antenna 112 to the receiving antenna 114b may be referred to as $d_2$. In instances when $d_1 \neq d_2$ there may be a relative phase shift between the LOS signal received at receiving antenna 114a and the LOS signal received at receiving antenna 114b.

For an RF signal, s(t), transmitted by the AP 102, which may be represented as shown in the following equation:

$$s(t) = Re\{A(t) \cdot e^{j \cdot \omega_r t}\} \quad [1]$$

where $\omega_r$ refers to the carrier frequency generated by AP 102, t represents time, A(t) represents the baseband signal transmitted by the AP 102, and j represents $\sqrt{-1}$.

Given the RF signal s(t) as shown in equation [1], the LOS RF signal received at the STA 104 via receiving antenna 114a, $r_1(t)$, may be represented as shown in the following equation:

$$r_1(t) \approx h_1 \cdot Re\left\{A(t) \cdot e^{j\left[\omega_r \left(t + \frac{d_1}{C}\right)\right]}\right\} + \eta_1 \quad [2]$$

where $h_1$ refers to the attenuation of the RF channel 106a, $d_1$ refers to the length of the signal path from the transmitting antenna 112 to the receiving antenna 114a, C refers to the velocity of propagation of RF signal via RF channel 106a and $\eta_1$ refers to the thermal noise generated by antenna 114a.

The LOS signal received at the STA 104 via receiving antenna 114b, $r_2(t)$, may be represented as shown in the following equation:

$$r_2(t) \approx h_2 \cdot Re\left\{A(t) \cdot e^{j\left[\omega_r \left(t + \frac{d_2}{C}\right)\right]}\right\} + \eta_2 \quad [3]$$

where $h_2$ refers to the attenuation of the RF channel 106b, $d_2$ refers to the length of the signal path from the transmitting antenna 112 to the receiving antenna 114b, C refers to the velocity of propagation of RF signal via RF channel 106b and $\eta_2$ refers to the thermal noise generated by antenna 114b.

The relative phase shift between signal $r_1(t)$ received via antenna 114a and signal $r_2(t)$ received via antenna 114b may be represented as shown in the following equation:

$$\theta = \frac{\omega_t}{C} \cdot (d_2 - d_1) \quad [4]$$

Various embodiments of the invention may comprise a method and system for estimating the relative phase shift θ during the phase shifter training phase. After estimating the relative phase shift value, subsequent signals received via receiving antenna 114b may be phase shifted at the STA 104 by $-\theta$ to generate a phase shifted signal $r_2'(t)$:

$$r_2'(t) \approx h_2 \cdot \text{Re}\left\{A(t) \cdot e^{j\left[\omega_t\left(t+\frac{d_2}{C}\right)-\theta\right]}\right\} + \eta_2 \quad [5]$$

A diversity reception signal, $r_{DIV}(t)$, may be generated by combining the signals $r_1(t)$ and $r_2'(t)$. In an exemplary embodiment of the invention, the signal $r_{DIV}(t)$ may be determined as shown in the following equation:

$$r_{DIV}(t) = w_1 \cdot r_1(t) + w_2 \cdot r_2'(t) \approx \quad [6]$$
$$(w_1 \cdot h_1 + w_2 \cdot h_2) \cdot \text{Re}\left\{A(t) \cdot e^{j\left[\omega_t\left(t+\frac{d_1}{C}\right)\right]}\right\} + w_1 \cdot \eta_1 + w_2 \cdot \eta_2$$

where may $w_1$ and $w_2$ represent weighting factors. As thermal noise components $\eta_1$ and $\eta_2$ introduced by antennas 114a and 114b are uncorrelated the diversity reception signal, $r_{DIV}(t)$ has a higher signal to noise ratio than either $r_1(t)$ or $r_2(t)$ signals. The signal to noise ratio can improve by up to 3 dB when channel attenuation values $h_1$ and $h_2$ are about equal. In an exemplary embodiment of the invention, which utilizes equal gain combining, $w_1=w_2=\frac{1}{2}$. Various embodiments of the invention may utilize other methods for determining a diversity reception signal, such as maximum ratio combining (MRC), for example.

Figure 2:
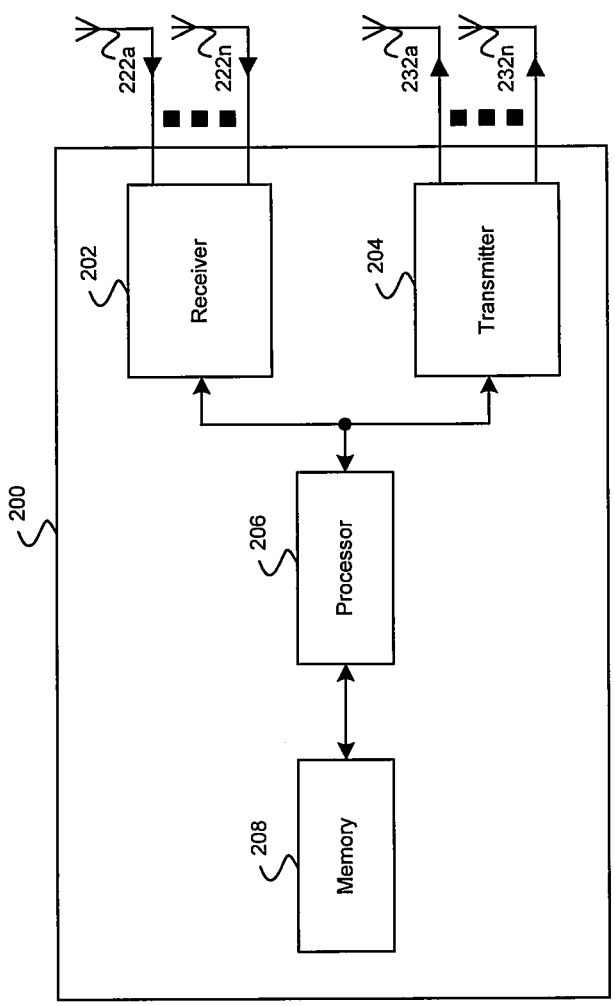
FIG. 2 is an exemplary transceiver comprising a plurality of transmitting antennas and a plurality of receiving antennas, which may be utilized in connection with an embodiment of the invention.

FIG. 2 is an exemplary transceiver comprising a plurality of transmitting antennas and a plurality of receiving antennas, which may be utilized in connection with an embodiment of the invention. Referring to FIG. 2, there is shown a transceiver system 200, a plurality of receiving antennas 222a . . . 222n and a plurality of transmitting antennas 232a . . . 232n. The transceiver system 200 may comprise at least a receiver 202, a transmitter 204, a processor 206, and a memory 208. Although a transceiver is shown in FIG. 2, transmit and receive functions may be separately implemented.

The processor 206 may enable digital receiver and/or transmitter functions in accordance with applicable communications standards. The processor 206 may also perform various processing tasks on received data. The processing tasks may comprise computing channel estimates, which may characterize the wireless communication medium, delineating packet boundaries in received data, and computing packet error rate statistics indicative of the presence or absence of detected bit errors in received packets.

The receiver 202 may perform receiver functions that may comprise, but are not limited to, the amplification of received RF signals, generation of frequency carrier signals corresponding to selected RF channels, the down-conversion of the amplified RF signals by the generated frequency carrier signals, demodulation of data contained in data symbols based on application of a selected demodulation type, and detection of data contained in the demodulated signals. The RF signals may be received via one or more receiving antennas 222a . . . 222n. The data may be communicated to the processor 206.

The transmitter 204 may perform transmitter functions that may comprise, but are not limited to, modulation of received data to generated data symbols based on application of a selected modulation type, generation of frequency carrier signals corresponding to selected RF channels, the up-conversion of the data symbols by the generated frequency carrier signals, and the generation and amplification of RF signals. The data may be received from the processor 206. The RF signals may be transmitted via one or more transmitting antennas 232a . . . 232n.

The memory 208 may comprise suitable logic, circuitry and/or code that may enable storage and/or retrieval of data and/or code. The memory 208 may utilize any of a plurality of storage medium technologies, such as volatile memory, for example random access memory (RAM), and/or non-volatile memory, for example electrically erasable programmable read only memory (EEPROM).

In the context of the present application, the processor 206 and the memory 208 may enable the determination of relative phase shift values, $\theta_i$, for signals received via the plurality of receiving antennas 222a . . . 222n. In an exemplary embodiment of the invention, the processor 206 and memory 208 may enable one of the receiving antennas may be selected to provide a reference phase value, where the relative phase shift value for signals received at each of the remaining receiving antennas may be determined relative to the reference phase value. The processor 206 and memory 208 may enable processing of subsequent signals received via each of the remaining receiving antennas. The processing may enable the subsequent received signals to be phase shifted based on the computed relative phase shift value for each corresponding receiving antenna. The processor 206 and memory 208 may enable the generation of a diversity reception signal by combining signals received via the selected receiving antenna and the processed signals received via the remaining receiving antennas. The memory 208 may enable the storage of weighting factors, which enable the processor 206 to compute the diversity reception signal.

Figure 3:
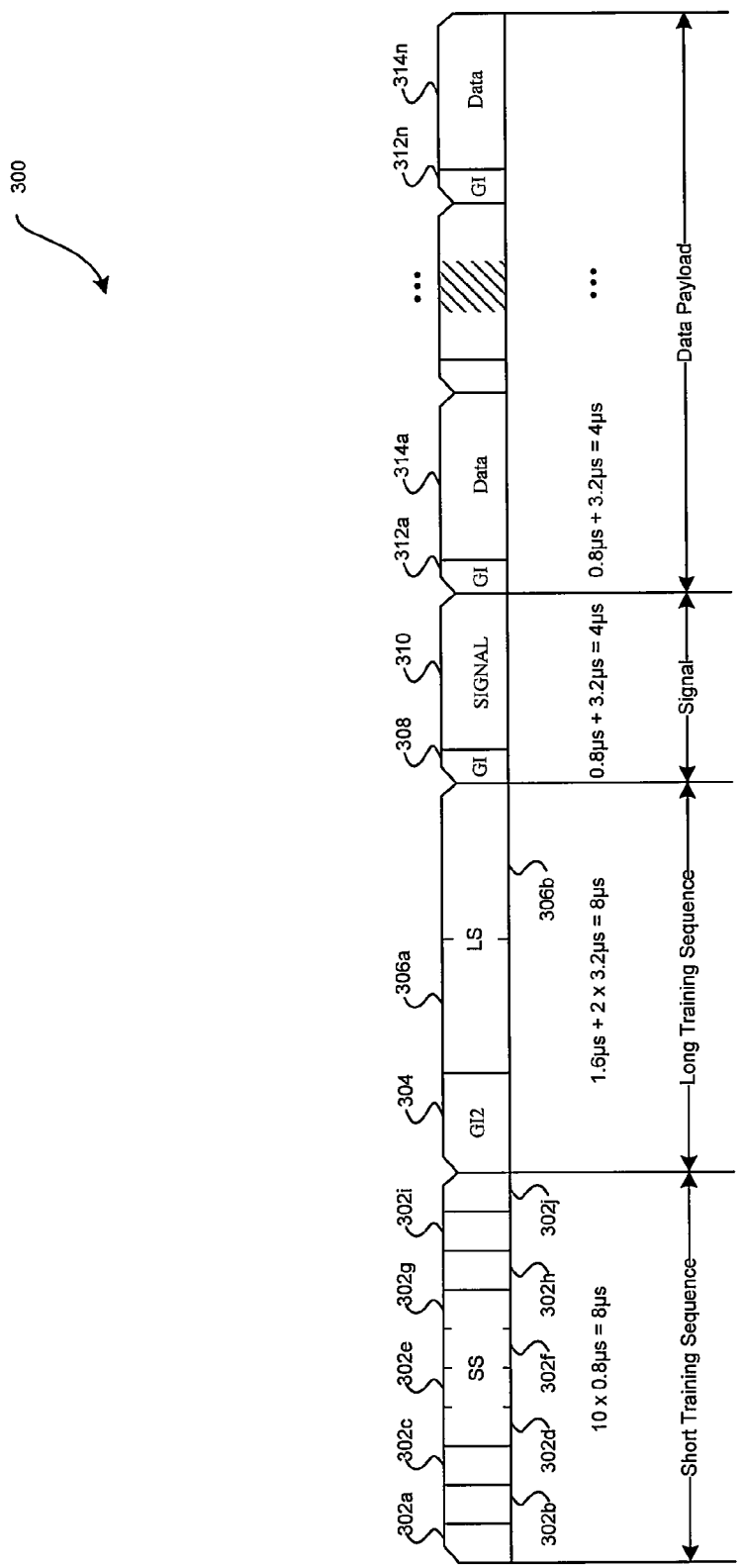
FIG. 3 is an illustration exemplary transmitted data unit in a WLAN, which may be utilized in connection with an embodiment of the invention.

FIG. 3 is an illustration exemplary transmitted data unit in a WLAN, which may be utilized in connection with an embodiment of the invention. Referring to FIG. 3, there is shown a physical layer protocol data unit (PPDU) 300. The PPDU 300 is exemplary of a PPDU, which may be transmitted in a WLAN system. The PPDU 300 may comprise a short training sequence and a long training sequence. The short training sequence may comprise ten identical short training symbols 302a, 302b, 302c, 302d, 302e, 302f, 302g, 302h, 302i and 302j. The long training sequence may comprise two long training symbols 306a and 306b. Each of the short training symbols may represent a predetermined data symbol value, which is transmitted for a predetermined time duration, for example, 0.8 µs. Consequently, in the exemplary illustration of FIG. 3, the duration of the short training sequence is 8 µs Following the completion of the short training sequence, the long training sequence may begin. In the exemplary PPDU 300, the long training sequence begins with transmission of a long training sequence guard interval (GI2) 304. The GI2 304 represents a time duration, which begins at the end of transmission of the last short training symbol 302j and ends with the beginning of transmission of the first long training symbol 306a. In the exemplary PPDU 300, the GI2 304 time duration is 1.6 µs. Each of the long training symbols may represent a predetermined data symbol value, which is transmitted for a predetermined time duration, for example, 3.2 µs. Consequently, in the exemplary illustration of FIG. 3, the duration of the long training sequence, which comprises the GI2 304 and two long training symbols 306a and 306b, is 8 µs. The short training symbols 302a, 302b, 302c, 302d, 302e, 302f, 302g, 302h, 302i and 302j, and the long training symbols 306a and 306b may form the preamble field within the PPDU 300.

Following the completion of the long training sequence, the signal segment in the PPDU 300 may be transmitted. The signal segment may comprise a guard interval 308 and a signal symbol 310. The GI 308 represents a time duration, which begins at the end of transmission of the last long training symbol 306b and ends with the beginning of transmission of the signal symbol 310. In the exemplary PPDU 300, the GI 308 time duration is 0.8 μs. The signal symbol 310 may comprise data, which indicates the data transfer rate (as measured in megabits per second Mb/s, for example) supported by the PPDU 300 and the quantity of data being transferred in the data payload portion of the PPDU 300 (as measured in octets, for example). The signal symbol may be transmitted for a predetermined time duration, for example, 3.2 μs.

The following completion of the signal segment, the data payload in the PPDU 300 may be transmitted. The data payload may comprise a plurality of data symbols 314a ... 314n, each separated by a GI 312a ... 312n. Each of the GI 312a ... 312n may be substantially similar to the GI 308. Each data symbol 314a ... 314n may comprise data, which is being transmitted from an AP 102 to a STA 104, for example. Each data symbol 314a ... 314n may be transmitted for a predetermined time duration, for example, 3.2 μs. The number of bits transmitted in each data symbol may be determined based on the contents of the signal symbol 310. For example, the data rate supported by the PPDU 300 may be computed based on the number of bits transmitted in each data symbol 314a, divided by the data symbol duration 3.2 μs. The aggregate number of bits transmitted in the plurality of data symbols 314a ... 314n may also be determined based on the contents of the signal symbol 310.

In operation, in an exemplary embodiment of the invention, an AP 102 may transmit a PPDU 300 via the transmitting antenna 112. The STA 104 may be initially configured to receive signals via the receiving antenna 114a. These signals may be represented as signals $r_1(t)$ as shown in equation [2], for example. The STA 104 receiver 202 converts RF signal $r_1(t)$ into baseband signal $b_1(t)$:

$$b_1(t) = g \cdot r_1(t) \cdot e^{j[-\omega_r t + \varphi]} \approx g \cdot h_1 \cdot A(t) \cdot e^{j\left[(\omega_t - \omega_r)\left(t + \frac{d_1}{C}\right)\right]} + g \cdot \psi \cdot \eta_1 \quad [7]$$

where $\omega_r$ refers to the local oscillator frequency generated by STA 104, φ refers to the phase difference between the oscillator used to generate the transmitted signal at the AP 102 and the oscillator used to down convert received signal at the STA 104, g refers to the gain of the receiver and ψ refers to the noise figure of the receiver.

The STA 104 may detect a received signal upon receipt of the short training symbol 302a. The STA 104 may receive short training symbols 302b and 302c via the receiving antenna 114a. The STA 104 may utilize the received short training symbols 302b and 302c to compute the frequency difference, $\omega_e$:

$$\omega_e = -\frac{1}{T} \cdot \arctan\left(\int_{t=t_1}^{t_1+T} b_1(t) \cdot b_1^*(t+T) dt\right) \approx \omega_t - \omega_r \quad [8]$$

where $t_1$ represents the time of the beginning of the short training symbol 302b, T refers to the symbol interval of the short training symbol 302b, T=0.8 us, (arg)* represents complex conjugate operation on the argument (for example, arg=$b_1$ in equation [8]). The value $\omega_e$ may represent the clock frequency offset between the transmitter, AP 102, and the receiver, STA 104. In addition, the STA 104 may determine the power of the received baseband signal, $b_1(t)$:

$$P_1 = \frac{1}{2T} \int_{t=t_1}^{t_1+2T} |b_1(t)|^2 dt \quad [9]$$

After receiving short training symbols 302b and 302c, via receiving antenna 114a, the STA 104 may be configured to receive subsequent signals via the receiving antenna 114b. These signals may be represented as signals $r_2(t)$ as shown in equation [3], for example. The STA 104 receiver 202 down converts RF signal $r_2(t)$ into baseband signal $b_2(t)$:

$$b_2(t) = g \cdot r_2(t) \cdot e^{j[-\omega_r t + \varphi]} \approx g \cdot h_2 \cdot A(t) \cdot e^{j\left[(\omega_t - \omega_r)\left(t + \frac{d_2}{C}\right)\right]} + g \cdot \psi \cdot \eta_2 \quad [10]$$

The STA 104 may receive short training symbols 302e and 302f via the receiving antenna 114b. The STA 104 may also compute the relative phase of the signals $b_1(t)$ and $b_2(t)$ to determine a relative phase, θ by correlating baseband signal corresponding to short training symbols 302b and 302c received via antenna 114a and short training symbols 302e and 302f received via antenna 114b:

$$\theta \approx -\arctan\left(\int_{t=t_1}^{t_1+2T} b_1(t) \cdot b_2^*(t+3T) dt\right) + 3T\omega_e \quad [11]$$

where $\omega_e$ refers to the frequency difference computed as shown in equation [8]. In addition, the STA 104 may determine the power of the received baseband signal $b_2(t)$:

$$P_2 = \frac{1}{2T} \int_{t=t_1+3T}^{t_1+5T} |b_2(t)|^2 dt \quad [12]$$

In various embodiments of the invention, a receiving station 200 may determine whether to enable diversity reception of signals received via a wireless communication medium. Diversity reception may be practiced in various embodiments of the invention in the receiving station 200, which comprises a plurality of $N_{RX}$ receiving antennas 222a ... 222n. The receiving station 200 may alternatively select one of the receiving antennas to receive short training symbols using a method, which is substantially similar to that described above. The receiving station 200 may select one of the receiving antennas 222 as a reference antenna. In an exemplary embodiment of the invention, the reference antenna may be selected based on the signal power values, $P_i$, for signals received at each of the receiving antennas 222a ... 222n. The receiving station may compute a plurality of relative phase values $\theta_i$, for i=0, 1, ..., $N_{RX}$−1, by comparing the relative phase of each of the signals $b_i(t)$, received by a corresponding one of the plurality of receiving antennas 222a ... 222n, to the signal received via the reference antenna. The plurality of relative phase values $\theta_i$ may be computed during a phase shifter training process.

The receiving station 200 may then begin a process to determine whether to utilize diversity reception of signals received via at least a portion of the plurality of receiving antennas 222a ... 222n. The receiving station 200 may compare signal power levels, $P_i$, for signals received during the phase shifter training process at each of the receiving antennas $222a \ldots 222n$. A receiving antenna i may be utilized for diversity reception of signals based on the following condition, for example:

$$P_i \cong P_{ref} \quad [13]$$

where $P_{ref}$ represents the signal power for signals received via the reference antenna during the phase shifter training process. In this aspect of the invention, receiving antennas may be selected based on a flat fading criterion. The set of antennas selected under the condition of equation [13] may be referred to as a flat fading antenna set.

After selecting a flat fading antenna set, the receiving station 200 may determine a diversity reception antenna set from among the flat fading antenna set based on a frequency selective fading criterion. In this aspect of the invention, the receiving station 200 may compute correlation values, $\sigma_i$, relative to the signals received via the reference antenna, $b_{ref}(t)$, as shown in the following equation, for example:

$$\sigma_i = \frac{\int_{t=t_{ref}}^{t_{ref}+T} |b_i(t+t_i-t_{ref}) \cdot b_{ref}(t)| dt}{\int_{t=t_{ref}}^{t_{ref}+T} |b_i(t+t_i-t_{ref})| \cdot |b_{ref}(t)| dt} \quad [14]$$

where $t_{ref}$ corresponds to the beginning time instant of the training symbol received via the reference antenna and $t_i$ corresponds to the beginning time instant of the training symbol received via the i-th antenna. Each of the correlation values may be compare to a threshold correlation value $\sigma_{thresh}$. Antennas in the diversity reception antenna set may be selected from the flat fading antenna set based on an exemplary frequency selective fading criterion as shown in the following equation:

$$\sigma_i \leq \sigma_{thresh} \quad [15]$$

For each of the antennas in the diversity reception antenna set, the relative phase value $\theta_i$ may be utilized to generate subsequent phase shifted received signals $r_i'(t)$:

$$r_i'(t) \approx h_i \cdot \text{Re}\left\{A(t) \cdot e^{j\left[\omega_r\left(t+\frac{d_i}{c}\right)-\theta_i\right]}\right\} + \eta_i \quad [16]$$

A diversity reception signal, $r_{DIV}(t)$, may be generated as shown in the following equation, for example:

$$r_{DIV}(t) \sum_{i=0}^{N_{DIV\_RX}-1} w_i \cdot r_i'(t) \quad [17]$$

where $N_{DIV\_RX}$ refers to the number of antennas in the diversity reception antenna set and $w_i$ refers to a weighting factor for the i-th antenna. In an exemplary embodiment of the invention, which utilizes equal gain combining, the weighting factors may be determined as shown in the following equation:

$$w_i = \frac{1}{N_{DIV\_RX}} \quad [18]$$

The subsequent signals receiving following the diversity antenna selection process may be utilized to carry long training symbols 306a and 306b, the signal symbol 310, and/or at least a portion of the plurality of data symbols $314a \ldots 314n$.

In various embodiments of the invention in which only the reference antenna meets the flat fading condition, as shown in equation [13] for example, or the frequency selective fading condition, as shown in equation [15] for example, then diversity reception may not be utilized at the receiving station 200 and subsequent signals may be received utilizing the reference antenna alone. In general, the single receiving antenna selected to receive subsequent signals may be the antenna, which received the strongest signal during the phase shifter training process, where the strongest signal may be determined based on the signal for which the received power level is the greatest. The subsequent signals received via the single selected receiving antenna may be utilized to carry long training symbols 306a and 306b, the signal symbol 310, and/or at least a portion of the plurality of data symbols $314a \ldots 314n$.

Figure 4A:
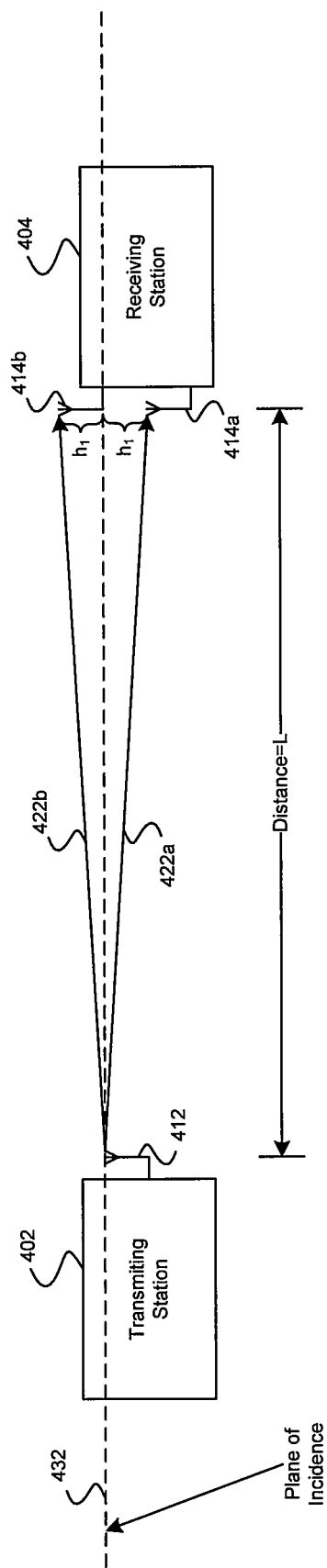
FIG. 4A is an exemplary diagram illustrating phase shifter training for equal phase received signals, in accordance with an embodiment of the invention.

FIG. 4A is an exemplary diagram illustrating phase shifter training for equal phase received signals, in accordance with an embodiment of the invention. Referring to FIG. 4A, there is shown a transmitting station 402 and a receiving station 404. The transmitting station 402 may comprise a transmitting antenna 412. The receiving station 404 may comprise a plurality of receiving antennas 414a and 414b. The receiving antenna 414a may receive signals transmitted via the transmitting antenna 412 via the line of sight (LOS) RF channel 422a. The receiving antenna 414b may receive signals transmitted via the transmitting antenna 412 via the LOS RF channel 422b. The phase of the signal $r_1(t)$ received via the LOS RF channel 422a at the receiving antenna 414a relative to the signal s(t) transmitted by the transmitting antenna 412 may be represented as $\theta_1$. The phase of the signal $r_2(t)$ received via the LOS RF channel 422b at the receiving antenna 414b relative to the signal s(t) transmitted by the transmitting antenna 412 may be represented as $\theta_2$. The plane of incidence 432 may represent a plane, which comprises the shortest distance, or straight-line distance from the transmitting antenna 412 to the receiving station 404.

As shown in FIG. 4A, the straight line distance may be represented by the variable L. Also shown in FIG. 4A, at the point of reception at the receiving antenna 414a, the LOS RF channel 422a is below the plane of incidence 432 by a distance $h_1$. At the point of reception at the receiving antenna 414b, the LOS RF channel 422b is above the plane of incidence 432 by a distance $h_1$. In this regard, the path length of the LOS RF channel 422a may be equal to the path length of the LOS RF channel 422b. Consequently, the phase of the signal $r_1(t)$, $\theta_1$, may be equal to the phase of the signal $r_2(t)$, $\theta_2$. As a result, the relative phase of the signal $r_2(t)$ to the signal $r_1(t)$, $\theta$, may be equal to zero (0) as shown in equation [4], for example. In the configuration shown in FIG. 4A, the phase shifter training process may compute a relative phase $\theta=0$. A diversity reception signal, $r_{DIV}(t)$, may be generated at the receiving station 404 by combining the signals $r_1(t)$ and $r_2(t)$ as shown in equation [6], where $\theta=0$, for example.

Figure 4B:
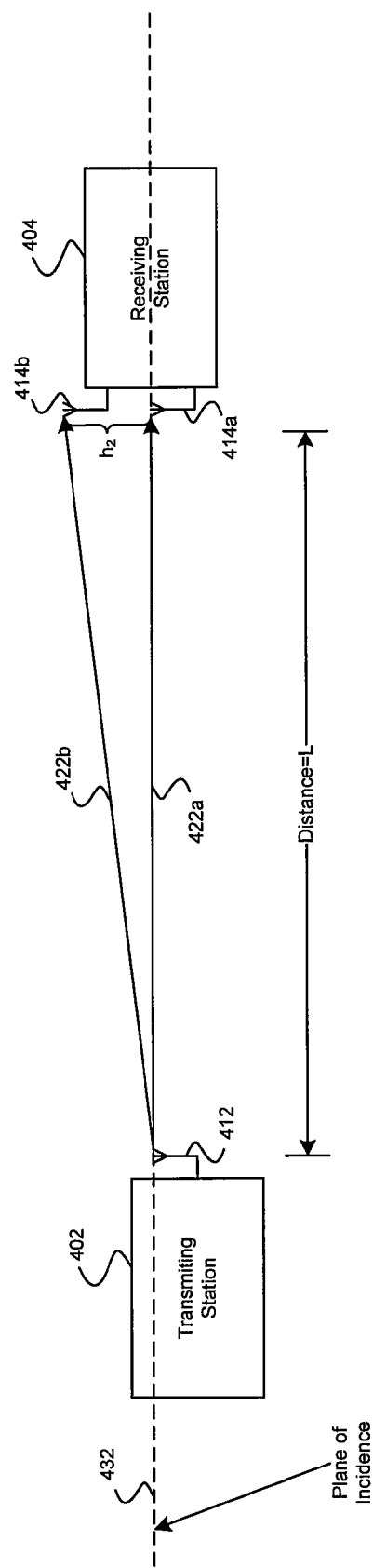
FIG. 4B is an exemplary diagram illustrating phase shifter training for unequal phase received signals, in accordance with an embodiment of the invention.

FIG. 4B is an exemplary diagram illustrating phase shifter training for unequal phase received signals, in accordance with an embodiment of the invention. Referring to FIG. 4B, the position of the receiving station 404 has been offset relative to the position shown in FIG. 4A such that the LOS RF channel 422a is coincident with the plane of incidence 432. At the point of reception at the receiving antenna 414b, the LOS RF channel 422b is above the plane of incidence 432 by a distance $h_2$. In this configuration, the receiving antenna 422a may be designated as the reference antenna at the receiving station 404 during the phase shifter training process. The path length of the LOS RF channel 422b may be greater than the path length of the LOS RF channel 422a. In addition, the phase value, $\theta_1$, may not be equal to the phase value, $\theta_2$. Consequently, the relative phase value $\theta$ may not be equal to zero (0). In this case, a diversity reception signal, $r_{DIV}(t)$, may be generated at the receiving station 404 by combining the signals $r_1(t)$ and $r'_2(t)$ as shown in equation [6], where $\theta \neq 0$, for example.

Figure 5:
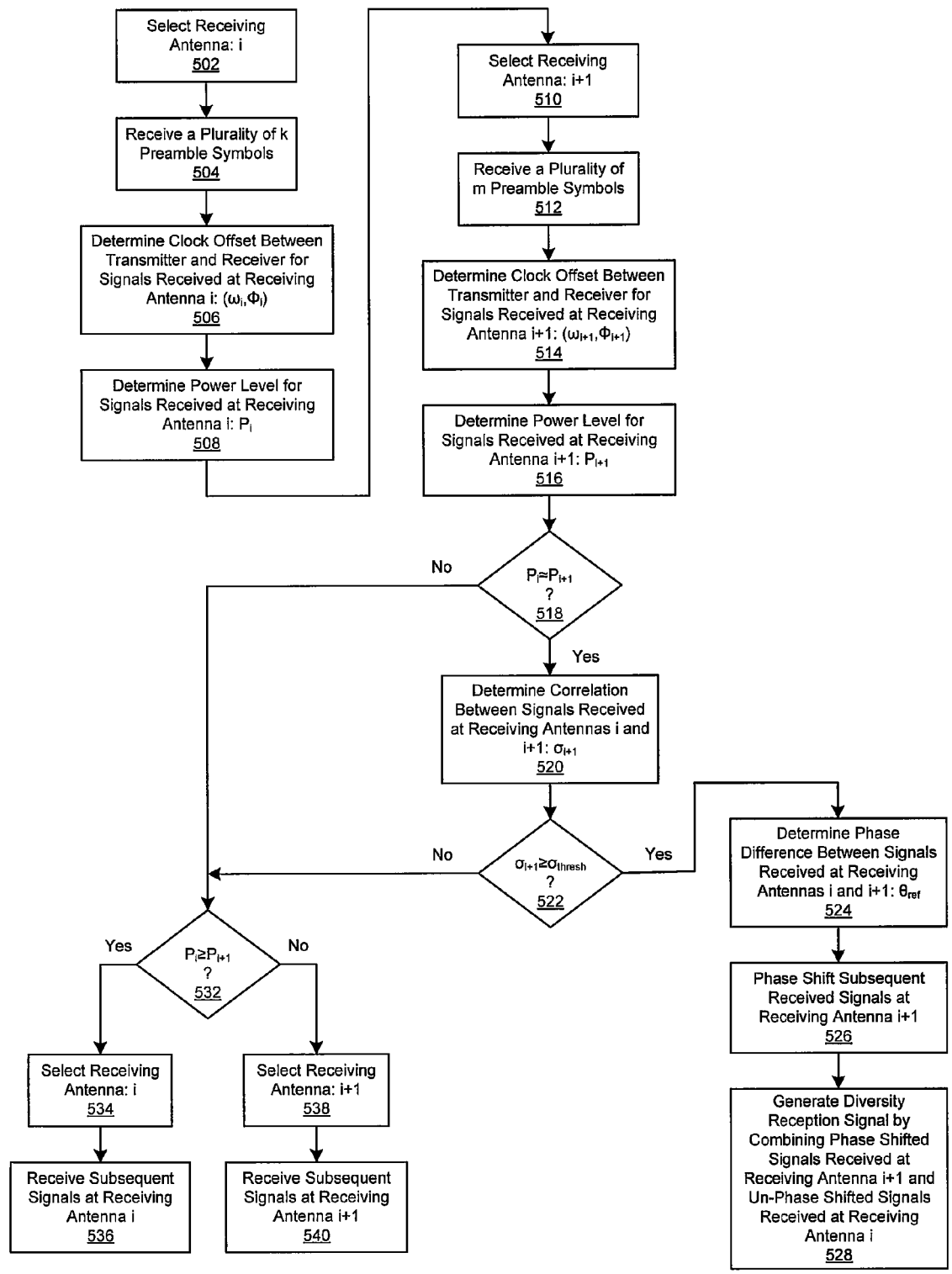
FIG. 5 is a flowchart illustrating exemplary steps for phase shifter training, in accordance with an embodiment of the invention.

FIG. 5 is a flowchart illustrating exemplary steps for phase shifter training, in accordance with an embodiment of the invention. Referring to FIG. 5, in step 502, the receiving station 200 may select a receiving antenna among the plurality of receiving antennas 222a . . . 222n. In step 504, the receiving antenna may be utilized to receive a plurality of k preamble symbols. The received preamble symbols may comprise short training symbols. In step 506, the receiving station 200 may determine a clock offset value between the receiving station 200 and the transmitting station, which generated the received signals. In step 508, the receiving station 200 may determine the power level for signals received via the selected receiving antenna.

In step 510, the receiving station 200 may select a subsequent receiving antenna. In step 512, the subsequent receiving antenna may be utilized to receive a plurality of m preamble symbols. In an exemplary embodiment of the invention, the m preamble symbols received in step 512 is equal to the k preamble symbols received in step 504, but the invention is not so limited to the condition m=k. In step 514, the receiving station 200 may determine a clock offset value. In step 516, the receiving station 200 may determine the signal power level for signals received via the subsequent selected receiving antenna. In various embodiments of the invention in which the receiving station comprises $N_{RX} > 2$, step 510-516 may be repeated for each remaining receiving antenna.

In step 518, the receiving station 200 may compare the power level, $P_i$, determined in step 508 to the power level, $P_{i+1}$, determined in step 516. When the power level, $P_i$, is approximately equal to the power level, $P_{i+1}$, in step 520, the receiving station 200 may determine a correlation value, $\sigma_{i+1}$, for preamble symbols received via the receiving antennas i and i+1, for example. In general, the correlation value may be computed between a reference antenna and any receiving antenna selected among the plurality of receiving antennas 222a . . . 222n. In step 522, the computed correlation value may be compared to a threshold correlation value. When the computed correlation value is determined to be greater than or equal to the threshold correlation value, in step 524, the relative phase value, $\theta_i$, between the antenna i+1 and the reference antenna (for example antenna i) may be determined. In step 526, the relative phase value may be utilized to phase shift subsequent signals received by the receiving antenna i+1. In step 528, a diversity reception signal may be generated by combining the phase shifted signals received at receiving antenna i+1 and the un-phase shifted signals received at the receiving antenna i.

When the power level $P_i$ is not determined in step 518 to be approximately equal to the power level $P_{i+1}$, in step 532, the receiving station 200 may determine whether the power level $P_i$ is greater than the power level $P_{i+1}$. When, in step 532, the power level $P_i$ is determined to be greater than or equal to the power level $P_{i+1}$, in step 534, the receiving antenna i may be selected. In step 536, the receiving antenna i may be utilized to receive subsequent signals. When, in step 532, the power level $P_i$ is not determined to be greater than or equal to the power level $P_{i+1}$, in step 538, the receiving antenna i+1 may be selected. In step 540, the receiving antenna i+1 may be utilized to receive subsequent signals.

When, in step 522, the computed correlation value is not determined to be greater than or equal to the threshold correlation value, step 532 may follow.

Various aspects of a system for phase shifter training in a WLAN system may comprise a receiver 202 that enables iterative selection of each receiving antenna in a plurality of receiving antennas 222a . . . 222n. Each antenna may be selected one at a time. The receiver 202 may enable reception of one or more short training symbols via each iteratively selected receiving antenna. The processor 206 may enable computation of a relative phase shift value $\theta_i$ for each iteratively selected receiving antenna. The relative phase shift value may be computed based on the phase of a received signal carrying a short training symbol and the phase of a reference signal. The receiver 202 may enable generation of a phase shifted signal, $r'_i(t)$, for each of the plurality of receiving antennas 222a . . . 222n by phase shifting on each subsequent signal, $r_i(t)$, comprising remaining portions of the physical layer protocol data unit (PPDU) 300, by the corresponding computed phase shift value $\theta(i)$. The processor 206 may enable generation of a diversity reception signal, $r_{DIV}(t)$, by combining the phase shifted signals $r'_i(t)$.

The reference signal may be one of the signals received via a selected on of the plurality of receiving antennas 222a . . . 222n. The processor 206 may enable determination of the selected antenna based on a computed signal power level, $P_i$, for one or more received signals $r_i(t)$ that carry short training symbol(s), which is received by the selected antenna. The computed signal power level, $P_i$, for the selected antenna may be greater than or equal to the computed signal power level, $P_j$, for signals $r_j(t)$ that carry short training symbols, which are received via the remaining receiving antennas.

The diversity reception signal may be generated by combining a selected portion of the generated phase shifted signals. The selected portion of the generated phase shifted signals may be determined by comparing a computed signal power level for received signals that carry short training symbols to a computed signal power level for the reference signal for each of the plurality of antennas 222a . . . 222n. A flat fading antenna set may be determined by selecting receiving antennas for which the computed signal power level for the received signals is approximately equal to the computed signal power level for the reference signal. A correlation value may be computed that measures a signal correlation between the received signals that carry short training symbols and the reference signal for each antenna in the flat fading antenna set. The each computed correlation value may be compared to a threshold correlation value. A diversity reception antenna set may be determined comprising selected antennas in the flat fading antenna set for which the computed correlation value is greater than or equal to the threshold correlation value. The diversity reception signal may be generated by computing a weighted average sum of each subsequent signal, which is concurrently received via the antennas in the diversity antenna reception set. In an exemplary embodiment of the invention, the weighted average sum may be computed as shown in equation [17].

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Another embodiment of the invention may provide a machine-readable storage having stored thereon, a computer program having at least one code section executable by a machine, thereby causing the machine to perform steps as described herein for WLAN phase shifter training.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for signal reception in a communication system, the system comprising:
   a plurality of antennas, each of said plurality of antennas being operable to receive a reference signal and a subsequent signal; and
   a processor operable to:
      generate a relative phase shift value for one or more antennas in the plurality of antennas based on a phase of the reference signal as received by each of the one or more antennas;
      generate a phase shifted version of the subsequent signal as received by each of the one or more antennas according to the corresponding relative phase shift value; and
      combine the generated phase shifted version of the subsequent signal with at least one other subsequent signal to enable diversity reception.

2. The system according to claim 1, wherein the processor is operable to generate the relative phase shift value by computing a plurality of correlation values based on the reference signal as received, by each antenna in the plurality of antennas, and the reference signal as transmitted.

3. The system according to claim 2, wherein the processor is operable to compare each of the computed correlation values to a threshold correlation value.

4. The system according to claim 1, wherein the processor is operable to determine a flat fading antenna set comprising two or more antennas in the plurality of antennas according to a received signal power level.

5. The system according to claim 4, wherein the processor is operable to compute a plurality of correlation values based on the reference signal as received, by each antenna in the flat fading antenna set, and the reference signal as transmitted.

6. The system according to claim 5, wherein the processor is operable to compare each of the computed correlation values to a threshold correlation value.

7. The system according to claim 6, wherein the processor is operable to determine a diversity reception antenna set comprising selected antennas in the flat fading antenna set for which the computed correlation value is greater than or equal to the threshold correlation value.

8. The system according to claim 7, wherein the processor is operable to generate the diversity reception signal by computing a weighted average sum of the each subsequent signal concurrently received via the diversity antenna reception set.

9. The system according to claim 1, wherein the reference signal comprises at least one preamble symbol.

10. A method for signal reception in a communication system, the method comprising:
    receiving a reference signal by each of a plurality of antennas;
    generating a relative phase shift value for one or more antennas in the plurality of antennas based on the phase of the reference signal as received by each antenna;
    receiving a subsequent signal by each of the plurality of antennas;
    generating a phase shifted version of the subsequent signal as received, by the one or more antennas in the plurality of antennas, according to the corresponding relative phase shift value; and
    combining the generated phase shifted version of the subsequent signal with at least one other subsequent signal to enable diversity reception.

11. The method according to claim 10, wherein generating the relative phase shift value comprises computing a plurality of correlation values based on the reference signal as received, by each antenna in the plurality of antennas, and the reference signal as transmitted.

12. The method according to claim 11, wherein the method comprises comparing each of the computed correlation values to a threshold correlation value.

13. The method according to claim 10, wherein the method comprises determining a flat fading antenna set comprising two or more antennas in the plurality of antennas according to a received signal power level.

14. The method according to claim 13, wherein the method comprises computing a plurality of correlation values based on the reference signal as received, by each antenna in the flat fading antenna set, and the reference signal as transmitted.

15. The method according to claim 14, wherein the method comprises comparing each of the computed correlation values to a threshold correlation value.

16. The method according to claim 6, wherein the method comprises determining a diversity reception antenna set comprising selected antennas in the flat fading antenna set for which the computed correlation value is greater than or equal to the threshold correlation value.

17. The method according to claim 7, wherein the method comprises generating the diversity reception signal by computing a weighted average sum of the each subsequent signal concurrently received via the diversity antenna reception set.

18. The method according to claim 1, wherein the reference signal comprises at least one preamble symbol.

19. A system for signal reception in a communication system, the system comprising:
    a plurality of antennas, each of said plurality of antennas being operable to receive a reference signal and a subsequent signal;
    a Radio Frequency (RF) front end coupled to the plurality of antennas; and
    a processor coupled to the RF front end and operable to:

generate a relative phase shift value for one or more antennas in the plurality of antennas based on a phase of the reference signal as received by each of the one or more antennas;

generate a phase shifted version of the subsequent signal as received by each of the one ore more antennas according to the corresponding relative phase shift value; and combine the generated phase shifted version of the subsequent signal with at least one other subsequent signal to enable diversity reception.

20. The system according to claim 19, wherein the processor is operable to generate the relative phase shift value by computing a plurality of correlation values based on the reference signal as received, by each antenna in the plurality of antennas, and the reference signal as transmitted.

* * * * *